(12) United States Patent
Makita (10) Patent No.: US 9,819,199 B2
(45) Date of Patent: Nov. 14, 2017

(54) POWER RECEPTION APPARATUS AND ELECTRONIC APPARATUS

(71) Applicant: TOKIN CORPORATION, Sendai-shi, Miyagi (JP)

(72) Inventor: Kazumasa Makita, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 200 days.

(21) Appl. No.: 14/763,139

(22) PCT Filed: Nov. 5, 2013

(86) PCT No.: PCT/JP2013/079807
§ 371 (c)(1),
(2) Date: Jul. 23, 2015

(87) PCT Pub. No.: WO2014/174708
PCT Pub. Date: Oct. 30, 2014

(65) Prior Publication Data
US 2015/0357829 A1    Dec. 10, 2015

(30) Foreign Application Priority Data

Apr. 26, 2013  (JP) .................................. 2013-093240

(51) Int. Cl.
*H02J 17/00* (2006.01)
*H02J 5/00* (2016.01)
(Continued)

(52) U.S. Cl.
CPC ............ *H02J 5/005* (2013.01); *H02J 7/0029* (2013.01); *H02J 7/025* (2013.01); *H02J 17/00* (2013.01);
(Continued)

(58) Field of Classification Search
CPC .......... H02J 17/00; H02J 7/0029; H02J 50/10; H02J 50/80; H04B 5/0057
(Continued)

(56) References Cited

U.S. PATENT DOCUMENTS

| 9,576,726 B2 * | 2/2017 | Mori ........................ H02J 17/00 |
| 2013/0270924 A1 | 10/2013 | Mori et al. | |
| 2015/0042170 A1 * | 2/2015 | Makita .................... H02J 17/00 |
| | | | 307/104 |

FOREIGN PATENT DOCUMENTS

| JP | 2011134049 A | 7/2011 |
| JP | 2012065455 A | 3/2012 |
| WO | 2012090904 A1 | 7/2012 |

OTHER PUBLICATIONS

International Search Report (ISR) dated Dec. 24, 2013 issued in International Application No. PCT/JP2013/079807.

\* cited by examiner

Primary Examiner — Robert Deberadinis
(74) Attorney, Agent, or Firm — Holtz, Holtz & Volek PC (57) ABSTRACT

This power reception apparatus is provided with a non-contact power reception antenna, a power supply unit, a communication antenna, a communication unit that performs communication via the communication antenna, a communication switch, and a switch control unit. The power supply unit outputs an output voltage corresponding to power received via the power reception antenna. The communication switch can transit between an electrically connected state wherein the communication unit is electrically connected to the communication antenna, and a disconnected state wherein the communication unit is disconnected from the communication antenna. The switch control unit makes the communication switch transit to the disconnected state when the output voltage of the power supply unit is (Continued)

increased over a first voltage, and the switch control unit makes the communication switch transit to the electrically connected state when the output voltage is reduced to below a second voltage that is lower than the first voltage.

13 Claims, 6 Drawing Sheets

(51) Int. Cl.
*H02J 7/02* (2016.01)
*H04B 5/00* (2006.01)
*H02J 7/00* (2006.01)
*H02J 50/10* (2016.01)
*H02J 50/80* (2016.01)

(52) U.S. Cl.
CPC ............ *H02J 50/10* (2016.02); *H04B 5/0037* (2013.01); *H02J 50/80* (2016.02)

(58) Field of Classification Search
USPC ........................................................ 307/104
See application file for complete search history.

POWER RECEPTION APPARATUS AND ELECTRONIC APPARATUS

TECHNICAL FIELD

This invention relates to a power reception device which communicates with a power transmission device in a non-contact manner and receives electric power from the power transmission device in a non-contact manner.

BACKGROUND ART

For example, this type of device is disclosed in Patent Document 1. The power-reception-side device (power reception device) of Patent Document 1 comprises a communication coil (communication antenna) used in communication with a power-transmission-side device (power transmission device) and a power reception coil (power reception antenna) used to receive electric power from the power-transmission-side device. The communication coil is connected with an IC chip (communication section) which processes a communication signal, and the power reception coil is connected with a smoothing circuit (power supply section). The communication coil is connected with a protection circuit in parallel to the IC chip. When an output voltage from the smoothing circuit increases above a predetermined value (threshold), the protection circuit works to prevent an excessive electric current flowing through the IC chip. Since the power-reception-side device of Patent Document 1 is formed as described above, the IC chip can be protected from a large voltage generated during the electric power reception.

PRIOR ART DOCUMENTS

Patent Document(s)

Patent Document 1: JP A 2012-65455

SUMMARY OF INVENTION

Technical Problem

When the communication section makes communication, not only the communication antenna but also the power reception antenna generates electric power. In some cases, the power supply section at that time outputs a voltage having a value (i.e. a voltage value in communication) nearly equal to a value of the voltage output from the power supply section during the electric power reception (i.e. a voltage value in electric power reception). In such cases, it is difficult to properly set a threshold at which the protection circuit is activated. In other words, it is difficult to properly protect the communication section.

It is therefore an object of the present invention to provide a power reception device which enables proper protection of its communication section even in a case where its voltage value in communication is nearly equal to its voltage value in electric power reception.

Solution to Problem

An aspect (first aspect) of the present invention provides a power reception device comprising a power reception antenna, a power supply section, a communication antenna, a communication section, a communication switch and a switch control section. The power reception antenna receives electric power in a non-contact manner. The power supply section is connected with the power reception antenna. The power supply section outputs an output voltage depending on electric power received via the power reception antenna. The communication section makes communication via the communication antenna. The communication switch is connected between the communication antenna and the communication section. The communication switch is switchable between an electrically connected state where the communication section is electrically connected with the communication antenna and an electrically disconnected state where the communication section is electrically disconnected from the communication antenna. The switch control section is connected with the power supply section. The switch control section performs control to switch the communication switch between the electrically connected state and the electrically disconnected state. The switch control section switches the communication switch into the electrically disconnected state when the output voltage increases above a first voltage, and switches the communication switch into the electrically connected state when the output voltage decreases below a second voltage smaller than the first voltage.

Another aspect (second aspect) of the present invention provides an electronic apparatus comprising the power reception device according to the first aspect of the present invention.

Advantageous Effects of Invention

The switch control section of the power reception device according to the present invention controls the communication switch to electrically disconnect the communication section from the communication antenna when the output voltage from the power supply section increases above the first voltage. Moreover, the switch control section controls the communication switch to electrically connect the communication section with the communication antenna when the output voltage decreases below the second voltage smaller than the first voltage. The switch control section thus controls the communication switch in a hysteresis manner with use of the first voltage and the second voltage having the respective values different from each other. Accordingly, even in a case where the voltage value in communication is nearly equal to the voltage value in electric power reception, the first voltage and the second voltage can be easily designed. The communication section can be therefore properly protected.

An appreciation of the objectives of the present invention and a more complete understanding of its structure may be had by studying the following description of the preferred embodiment and by referring to the accompanying drawings.

DESCRIPTION OF EMBODIMENTS

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First Embodiment

Figure 1:
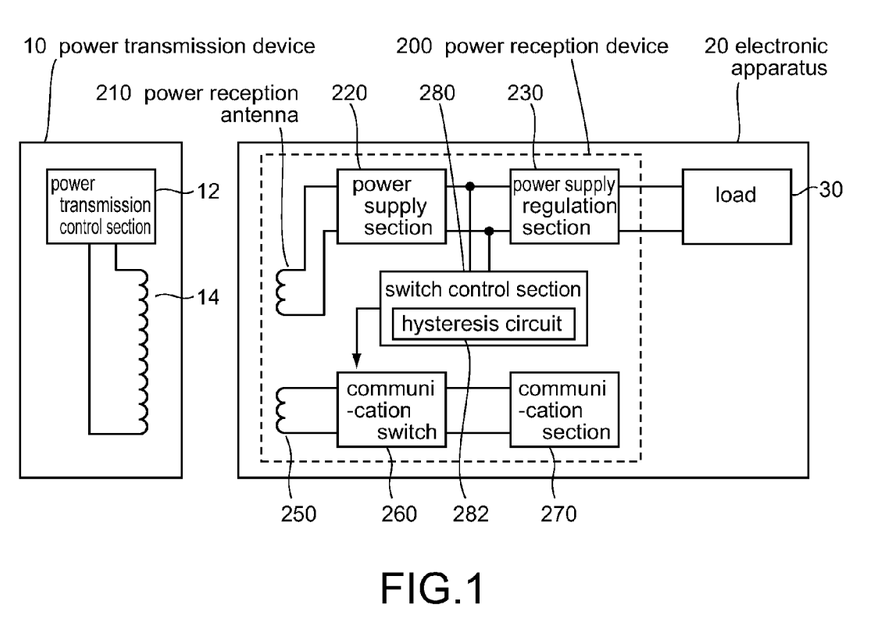
FIG. 1 is a block diagram schematically showing a power reception device according to a first embodiment of the present invention and a power transmission device which is a mating device of the power reception device.

As shown in FIG. 1, an electronic apparatus 20 according to a first embodiment of the present invention comprises a load 30 and a power reception device 200. The electronic apparatus 20 is a mobile telephone or a digital camera, for example. The electronic apparatus 20 includes various circuits which are not shown in FIG. 1. The load 30 is, for example, a battery for supplying electric power to the circuits of the electronic apparatus 20.

As can be seen from FIG. 1, the power reception device 200 receives electric power from a power transmission device 10 (mating device) in a non contact manner to supply the electric power to the load 30 as well as communicates with the power transmission device 10 in a non-contact manner. For example, the power transmission device 10 is installed in an Integrated Circuit (IC) card reader (not shown). For example, the power reception device 200 makes communication according to Near Field Communication (NFC) standard. However, the present invention is also applicable to the power reception device 200 which is not in compliant with NFC standard.

As shown in FIG. 1, the power transmission device 10 comprises a power transmission control section 12 and a power transmission antenna 14. The power transmission control section 12 uses the power transmission antenna 14 to transmit the electric power to the power reception device 200 as well as to communicate with the power reception device 200. In other words, according to the present embodiment, the power transmission antenna 14 of the power transmission device 10 works as both an antenna for electric power transmission and an antenna for communication. However, the power transmission device 10 may comprise a communication antenna other than the power transmission antenna 14.

The power reception device 200 comprises a power reception antenna 210, a power supply section 220, a power supply regulation section 230, a communication antenna 250, a communication switch 260, a communication section 270 and a switch control section 280.

The power reception antenna 210 receives the electric power transmitted from the power transmission antenna 14 in a non-contact manner. The power reception antenna 210 according to the present embodiment is a loop antenna or a coil antenna, for example. The power reception antenna 210 receives AC power from the power transmission antenna 14, wherein electromagnetic induction transmits the AC power with use of magnetic flux.

The power supply section 220 is connected with the power reception antenna 210. The power supply section 220 outputs an output voltage (V0) depending on the electric power received via the power reception antenna 210. The power supply section 220 according to the present embodiment includes a rectifier circuit and a smoothing circuit to output a DC voltage.

The power supply regulation section 230 is connected in series between the power supply section 220 and the load 30. The power supply regulation section 230 regulates the output voltage (V0) supplied to the load 30. The power supply regulation section 230 according to the present embodiment is a DC-to-DC converter which converts the output voltage (V0) into a supply voltage (V1) which is suitable to the load 30 and supplied to the load 30. The supply voltage (V1) is used to charge the load 30.

As can be seen from the above explanation, the power supply section 220 according to the present embodiment is indirectly connected to the load 30 outside of the power reception device 200, and the supply voltage (V1) depending on the output voltage (V0) is supplied to the load 30. However, in such a case that the load 30 can receive the output voltage (V0) with no regulation, the power supply regulation section 230 does not need to be provided. In this case, the power supply section 220 is directly connected to the load 30, and the supply voltage (V1) equivalent to the output voltage (V0), i.e. depending on the output voltage (V0), is supplied to the load 30.

The communication antenna 250 transmits a signal to and receives a signal from the power transmission antenna 14. The communication antenna 250 according to the present embodiment is a loop antenna or a coil antenna, for example.

The communication section 270 is connected with the communication antenna 250 via the communication switch 260. For example, the communication section 270 according to the present embodiment is a communication circuit having NFC function embedded therewithin. The communication section 270 makes communication with a mating device such as the power transmission device 10 or another non-illustrated device via the communication antenna 250. In other words, the communication section 270 receives a signal from the mating device as well as transmits a signal to the mating device. More specifically, the communication section 270 according to NFC standard works as an IC card or an IC tag under Card Emulation Mode to make communication with a mating reader/writer, works as a reader/writer under Reader/Writer mode to make communication with a mating IC card or a mating IC tag and makes bidirectional communication with the mating device under Peer-to-Peer mode. In these cases, a signal is transmitted or received between the communication section 270 and the mating device.

The communication switch 260 is connected in series between the communication antenna 250 and the communication section 270. The communication switch 260 is designed to be switchable between an electrically connected state (i.e. communicatable state) where the communication section 270 is electrically connected with the communication antenna 250 and an electrically disconnected state (i.e. uncommunicatable state) where the communication section 270 is electrically disconnected from the communication antenna 250.

The communication switch 260 is controlled by the switch control section 280. The switch control section 280 is connected with the power supply section 220. The switch control section 280 performs control to switch the communication switch 260 between the electrically connected state and the electrically disconnected state. In detail, the switch control section 280 includes a hysteresis circuit 282. The hysteresis circuit 282 switches the communication switch 260 from the electrically connected state into the electrically disconnected state under a predetermined condition. Moreover, the hysteresis circuit 282 switches the communication switch 260 from the electrically disconnected state into the electrically connected state under another predetermined condition.

More specifically, the hysteresis circuit 282 performs control to switch the communication switch 260 into the electrically disconnected state when the output voltage (V0) of the power supply section 220 increases above a predetermined first voltage. Moreover, the hysteresis circuit 282 performs control to switch the communication switch 260 into the electrically connected state when the output voltage (V0) decreases below a predetermined second voltage smaller than the first voltage. The hysteresis circuit 282, which performs hysteresis control as described above, can be formed of a flip-flop circuit or a Schmitt trigger circuit, for example.

In general, the electronic apparatus 20 is required to have a reduced size. Accordingly, the power reception device 200 needs to have a compact structure, and the communication antenna 250 is therefore arranged in the vicinity of the power reception antenna 210. The thus-arranged power reception antenna 210 and the communication antenna 250 affect each other. Moreover, each of the power reception antenna 210 and the communication antenna 250 generates electric power during both the electric power transmission and the signal transmission from the power transmission antenna 14 of the power transmission device 10. In particular, when the power reception antenna 210 receives the electric power, the communication antenna 250 might generate a voltage beyond an endurable voltage of the communication section 270. As explained below, according to the present embodiment, the communication section 270 can be protected even in this case because the communication switch 260 is switched into the electrically disconnected state.

Hereafter, detailed explanation will be made about this protection of the communication section 270 as referring to FIG. 7.

Figure 7:
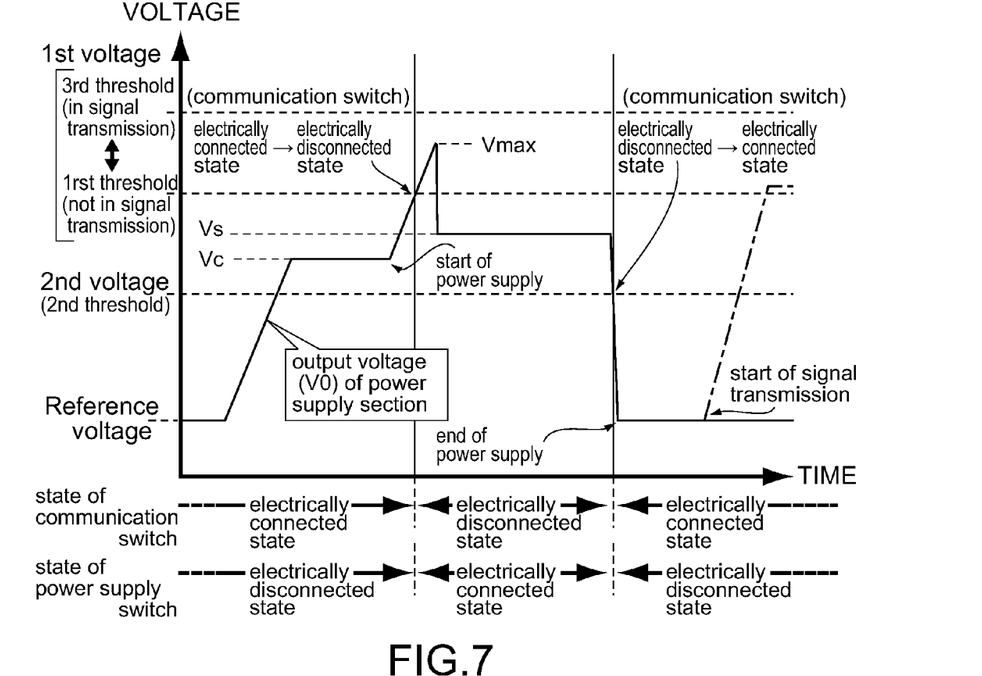
FIG. 7 is a view schematically showing a change of an output voltage of the power reception device of FIG. 1.

As shown in FIG. 7, when the power reception device 200 receives no electric power and makes no communication, the output voltage (V0) of the power supply section 220 is equivalent to a predetermined reference voltage value, or the ground. In the meantime, the communication switch 260 is in the electrically connected state.

When the power reception device 200 is placed in a region where the communication with the power transmission device 10 can be made, such as a case where a mobile telephone is placed over an IC card reader, the power transmission control section 12 of the power transmission device 10 and the communication section 270 of the power reception device 200 perform authentication with use of a predetermined Identifier (ID). In other words, the power reception device 200, or the communication section 270, starts the communication. When the communication section 270 starts the communication, the power reception antenna 210 also generates electric power which causes the output voltage (V0) to increase to Vc.

Then, if the authentication between the power transmission control section 12 and the communication section 270 succeeds, the power transmission control section 12 starts the electric power transmission to the power reception device 200. In other words, the power reception device 200 starts electric power reception. The power supply section 220 therefore actively starts to output the output voltage (V0). At that time, the load 30 side, or the power supply regulation section 230, is not activated yet, so that an input impedance of the load 30 side temporarily becomes high until the power supply regulation section 230 is activated to start to supply the electric power to the load 30. Accordingly, the output electric power of the power transmission device 10 is temporarily elevated so that the output voltage (V0) of the power supply section 220 also temporarily increases to reach a maximum value Vmax. When the power supply regulation section 230 is activated, the input impedance of the load 30 side is lowered. Accordingly, the output voltage (V0) reaches, subsequent to the maximum value Vmax, a stable value Vs smaller than the maximum value Vmax.

According to the present embodiment, the first voltage of the hysteresis circuit 282 has a value equal to a first threshold which is larger than the stable value Vs and smaller than the maximum value Vmax. The output voltage (V0) therefore increases above the first voltage when the output voltage (V0) increases toward the maximum value Vmax. As a result, the control of the switch control section 280 switches the communication switch 260 into the electrically disconnected state. The communication section 270 is thus protected during the electric power supply of the power supply section 220. The value of the first voltage may be set to be smaller than the endurable voltage of the communication section 270 so that the communication section 270 can be prevented from being damaged during a period before the output voltage (V0) reaches the first voltage.

The power transmission control section 12 ends the electric power transmission after transmitting the electric power for a predetermined period. As a result, the power reception device 200 ends the electric power reception. The power supply section 220 therefore ends to output the output voltage (V0), and the output voltage (V0) decreases to the reference value. According to the present embodiment, the second voltage of the hysteresis circuit 282 has a value equal to a second threshold which is smaller than the stable value Vs and is therefore smaller than the first threshold. For example, the second threshold is not more than 90% of the stable value Vs. The output voltage (V0) therefore decreases below the second voltage when the output voltage (V0) decreases from the stable value Vs toward the reference voltage value. As a result, the control of the switch control section 280 switches the communication switch 260 into the electrically connected state. In other words, the communication section 270 becomes communicatable.

As can be seen from FIG. 7, if only one threshold is used to switch the communication switch 260 between the electrically connected state and the electrically disconnected state, the threshold needs to be set to a value between Vc and the stable value Vs, wherein Vc is a value of the voltage generated during the communication, and the stable value Vs is another value of the voltage generated during the electric power reception. However, in a case where the value Vc of the voltage generated during the communication and the stable value Vs of the voltage generated during the electric power reception are nearly equal to each other, the threshold is difficult to be properly set. In other words, the communication section 270 is difficult to be properly protected. In contrast, the switch control section 280 according to the present embodiment uses the first voltage and the second voltage having values different from each other to control the communication switch 260. The communication section 270 can be therefore properly protected even in the case where the value Vc of the voltage generated during the communication and the stable value Vs of the voltage generated during the electric power reception are nearly equal to each other.

Hereafter, detailed explanation will be made about a structure of the communication switch 260 which functions as described above.

Figure 2:
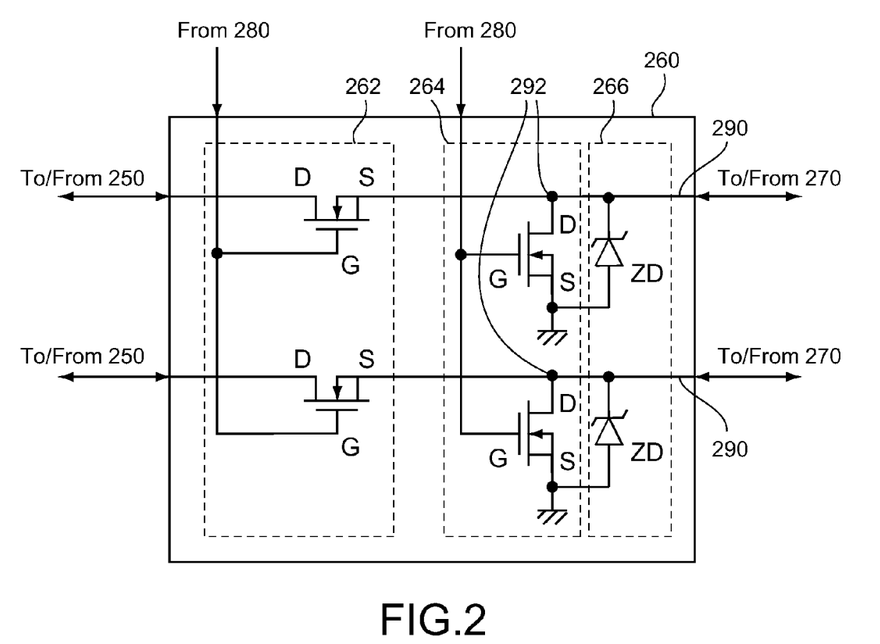
FIG. 2 is a circuit diagram schematically showing a communication switch of the power reception device of FIG. 1.

As shown in FIG. 2, the communication switch 260 according to the present embodiment has an in-line switch 262 and a ground switch 264.

The in-line switch 262 is connected in series between the communication antenna 250 and the communication section 270. In detail, the power reception device 200 is provided with two lines 290. Each of the lines 290 connects the communication antenna 250 and the communication section 270 with each other. The in-line switch 262 includes two N-channel FETs. The FETs of the in-line switch 262 are arranged on the respective lines 290. For each FET, the drain (D) is connected with the communication antenna 250, and the source (S) is connected with the communication section 270. The gate (G) is connected with the switch control section 280.

The ground switch 264 is connected between a connection point 292 and the ground, wherein the connection point 292 is located between the communication antenna 250 and the communication section 270. In detail, the ground switch 264 includes two N-channel FETs. Each of the FETs of the ground switch 264 is arranged between the corresponding line 290 and the ground. For each FET, the drain (D) is connected with the connection point 292 of the line 290, and the source (S) is connected with the ground. The gate (G) is connected with the switch control section 280.

Since the communication switch 260 is formed as described above, the switch control section 280 can electrically disconnect the ground switch 264 at the same time as the in-line switch 262 is electrically connected and, therefore, can switch the communication switch 260 into the electrically connected state. Moreover, the switch control section 280 can electrically connect the ground switch 264 at the same time as the in-line switch 262 is electrically disconnected and, therefore, can switch the communication switch 260 into the electrically disconnected state. As can be seen from the above explanation, according to the present embodiment, the communication section 270 can be more reliably protected.

The communication switch 260 according to the present embodiment further has a protection section 266. The protection section 266 according to the present embodiment includes two zener diodes (ZD). The two zener diodes (ZD) are connected in parallel to the two FETs of the ground switch 264, respectively. In detail, for each zener diode (ZD), the cathode is connected with the line 290 and the anode is connected with the ground. The thus-formed protection section 266 prevents the communication section 270 from receiving an input voltage larger than a predetermined value such as the Zener voltage value in the present embodiment when the communication switch 260 is switched into the electrically disconnected state from the electrically connected state. In other words, the communication switch 260 according to the present embodiment, since having the protection section 266, has an input protection function which prevents the communication section 270 from receiving an input voltage above its endurable voltage. However, the communication switch 260 can work even if the protection section 266 is not provided.

As shown in FIGS. 3 to 6, the communication switch 260 can be variously modified.

Figure 3:
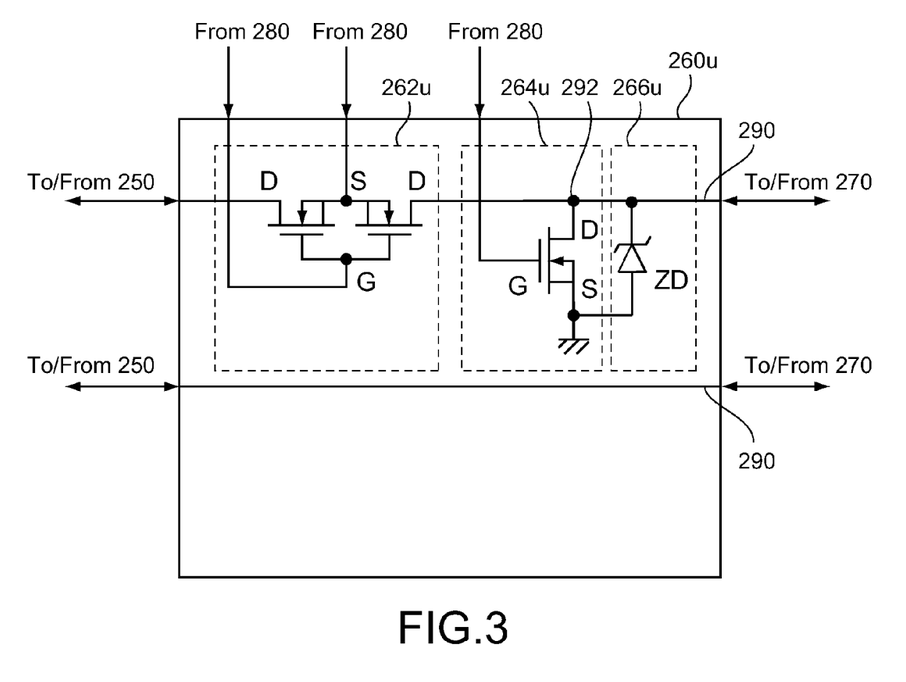
FIG. 3 is a circuit diagram schematically showing a first modification of the communication switch of FIG. 2.

As shown in FIG. 3, a communication switch 260u according to a first modification has an in-line switch 262u, a ground switch 264u and a protection section 266u. The in-line switch 262u includes two N-channel FETs. The FETs of the in-line switch 262u are arranged on only one of the two lines 290. According to the present modification, the two FETs form one bidirectional switch. The ground switch 264u according to the present modification includes one N-channel FET. The FET of the ground switch 264u is arranged between the line 290 provided with the in-line switch 262u and the ground. The protection section 266u according to the present modification includes one zener diode (ZD). The zener diode (ZD) of the protection section 266u is connected in parallel to the FET of the ground switch 264u. The communication switch 260u according to the present modification functions similar to the communication switch 260 (see FIG. 2) according to the present embodiment.

Figure 4:
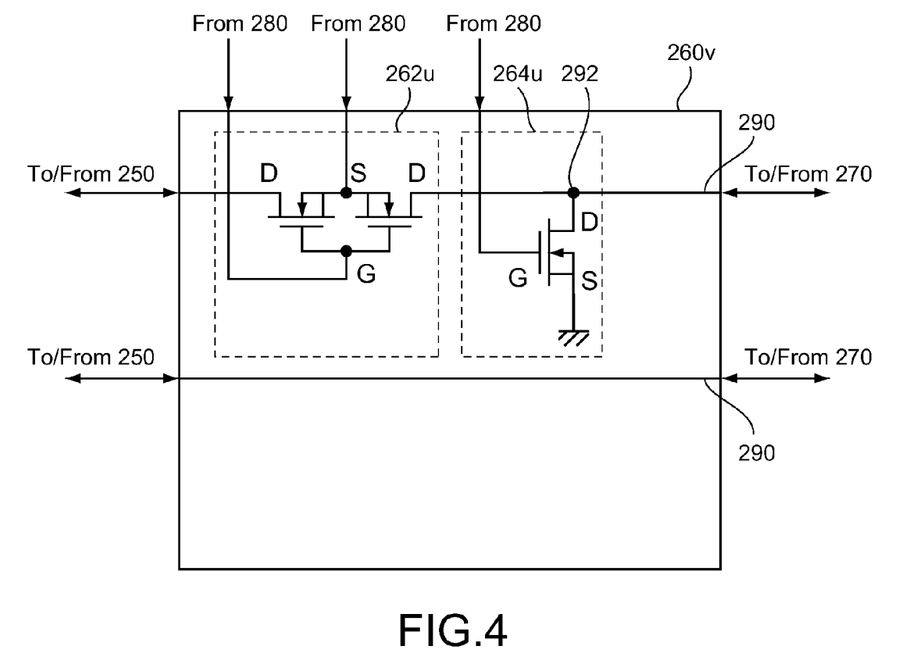
FIG. 4 is a circuit diagram schematically showing a second modification of the communication switch of FIG. 2.

As shown in FIG. 4, a communication switch 260v according to a second modification has the in-line switch 262u and the ground switch 264u. In other words, the communication switch 260v according to the present modification is formed similar to the communication switch 260u (see FIG. 3) according to the first modification except for not having the protection section 266u. According to the present modification, the communication switch 260v can properly change its state similar to the communication switch 260 (see FIG. 2) and the communication switch 260u (see FIG. 3).

Figure 5:
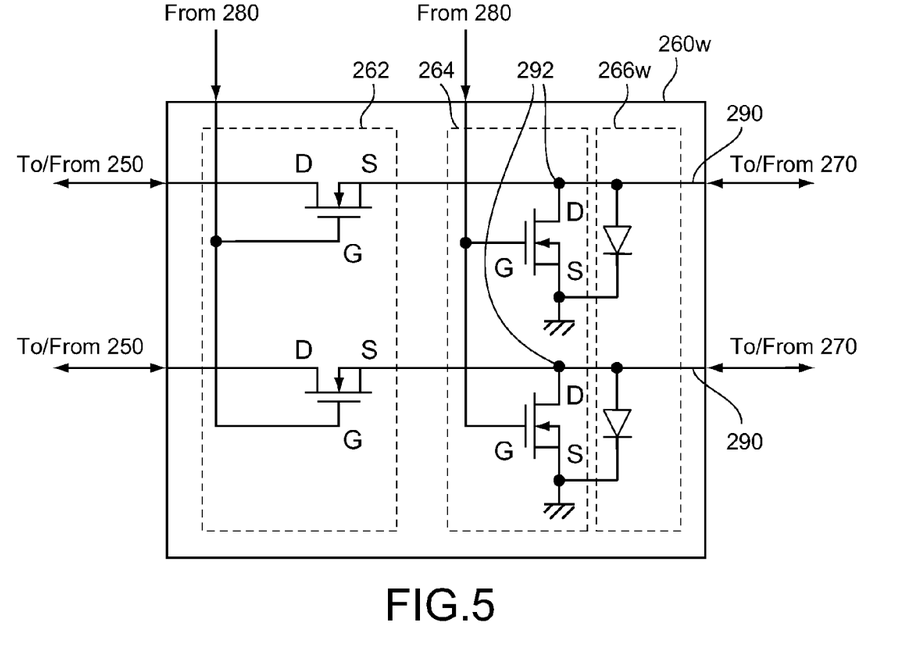
FIG. 5 is a circuit diagram schematically showing a third modification of the communication switch of FIG. 2.

As shown in FIG. 5, a communication switch 260w according to a third modification has the in-line switch 262, the ground switch 264 and a protection section 266w. In other words, the communication switch 260w according to the present modification is formed similar to the communication switch 260 (see FIG. 2) except the protection section 266w. The protection section 266w according to the present modification includes not the two zener diodes (ZD) but two diodes. The two diodes are connected in parallel to the two FETs of the ground switch 264, respectively. In detail, for each diode, the anode is connected with the line 290, and the cathode is connected with the ground. The thus-formed protection section 266w prevents the communication section 270 from receiving an input voltage larger than a predetermined value such as the forward voltage (VF) of the diode in the present embodiment when the communication switch 260w is switched into the electrically disconnected state from the electrically connected state. In other words, the protection section 266w according to the present modification functions similar to the protection section 266 (see FIG. 2) and the protection section 266u (see FIG. 3).

Figure 6:
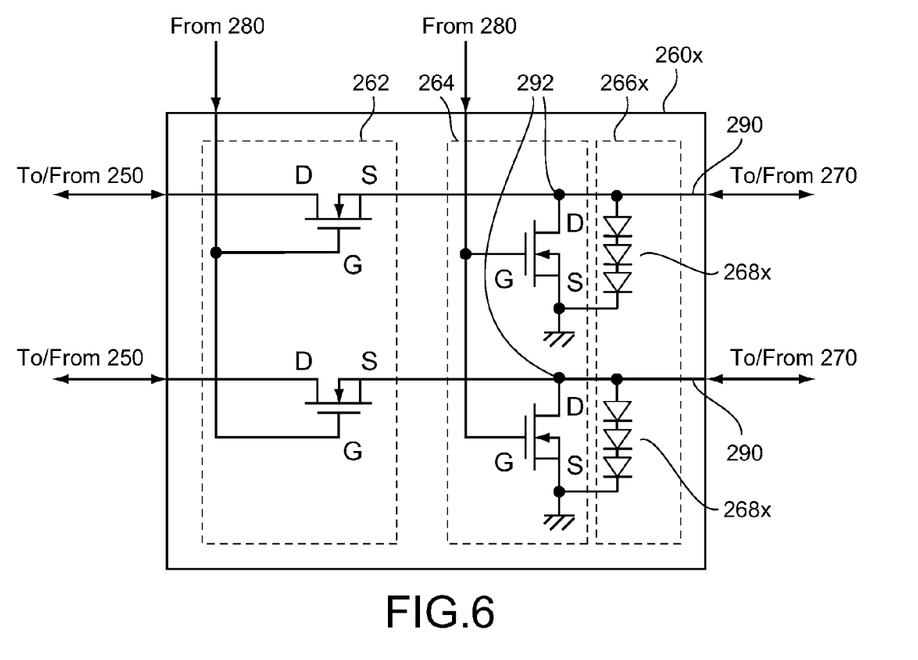
FIG. 6 is a circuit diagram schematically showing a forth modification of the communication switch of FIG. 2.

As shown in FIG. 6, a communication switch 260x according to a forth modification has the in-line switch 262, the ground switch 264 and a protection section 266x. In other words, the communication switch 260x according to the present modification is formed similar to the communication switch 260w (see FIG. 5) except the protection section 266x. The protection section 266x according to the present modification includes two diode arrays 268x. Each of the diode arrays 268x is formed of a plurality of diodes, for example, three diodes, connected in series to one another. The diode arrays 268x are connected in parallel to the two FETs of the ground switch 264, respectively. In detail, for each diode array 268x, the anode at its end is connected with the line 290, and the cathode at its opposite end is connected with the ground. The thus-formed protection section 266x prevents the communication section 270 from receiving an input voltage larger than a predetermined value such as three times of the forward voltage (VF) of the diode in the present embodiment when the communication switch 260x is switched into the electrically disconnected state from the electrically connected state. As can be seen from the above explanation, when a plurality of the diodes are provided, a voltage at which the protection section 266x is activated can be more properly designed so as to be adjusted to the endurable voltage of the communication section 270.

Second Embodiment

Figure 8:
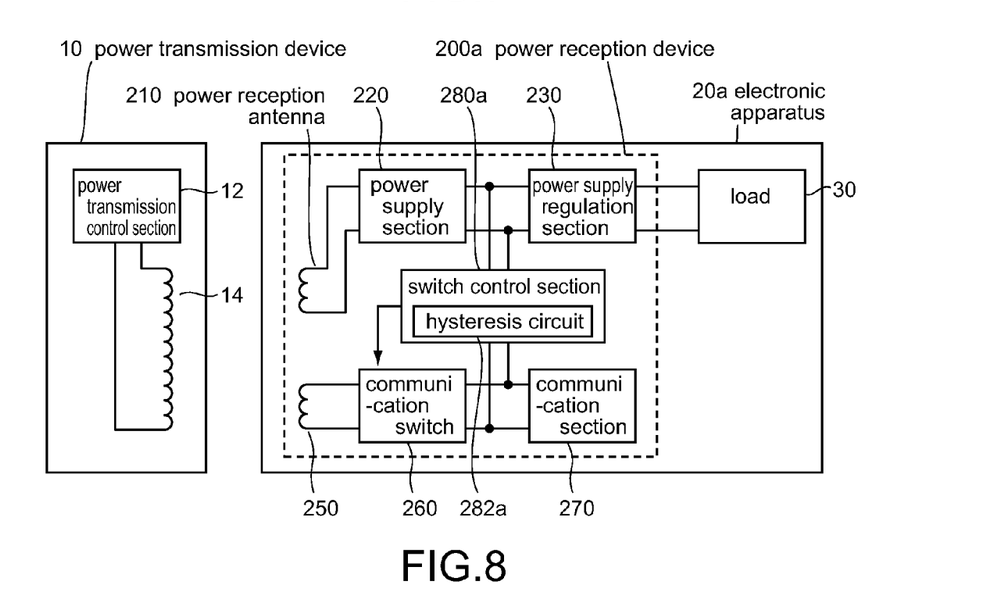
FIG. 8 is a block diagram schematically showing a power reception device according to a second embodiment of the present invention and the power transmission device.

As shown in FIG. 8, an electronic apparatus 20a according to a second embodiment of the present invention comprises a power reception device 200a and the load 30. As can be seen from FIGS. 1 and 8, the power reception device 200a is a modification of the power reception device 200 according to the first embodiment. Hereafter, explanation will be made only about differences between the first embodiment and the present embodiment as referring to Figures.

As shown in FIG. 8, the power reception device 200a comprises a switch control section 280a instead of the switch control section 280 (see FIG. 1). The switch control section 280a is not only connected with the power supply section 220 but also connected between the communication switch 260 and the communication section 270. The thus-formed switch control section 280a can use an output from the communication section 270 to detect whether the communication section 270 is assigned to signal transmission via the communication antenna 250 or not. The switch control section 280a shifts the value of the first voltage into a third threshold which is larger than the first threshold (see FIG. 7) when detecting that the communication section 270 is assigned to the signal transmission.

In general, the electric power generated in the communication antenna 250 during the signal transmission, or during a period in which the communication section 270 transmits a signal via the communication antenna 250, is larger than the electric power generated in the communication antenna 250 during signal reception, or during a period in which the communication section 270 receives a signal via the communication antenna 250. In addition, as previously described, the power reception antenna 210 and the communication antenna 250 affect each other. Because of the reasons described above, the output voltage (V0) of the power supply section 220 might increase above the first threshold during the signal transmission (see chain dotted line in FIG. 7).

As can be seen from FIG. 7, according to the first embodiment, when the output voltage (V0) increases above the first threshold, the communication switch 260 is switched into the electrically disconnected state even during the communication. The communication section 270 therefore becomes uncommunicatable. However, according to the present embodiment, when the communication section 270 is assigned to the signal transmission via the communication antenna 250, the first voltage has a value equal to the third threshold which is larger than the maximum value Vmax of the output voltage (V0). According to the present embodiment, such a large value that is not normally generated is used as the third threshold so that the communication switch 260 can be prevented from being switched into the electrically disconnected state during the communication. In addition, according to the present embodiment, when the communication section 270 is not assigned to the signal transmission via the communication antenna 250, the first voltage has the value equal to the first threshold which is larger than the stable value Vs of the output voltage (V0) and smaller than the maximum value Vmax similar to the first embodiment. The communication section 270 is therefore protected similar to the first embodiment when the power reception device 200 receives the electric power.

Third Embodiment

Figure 9:
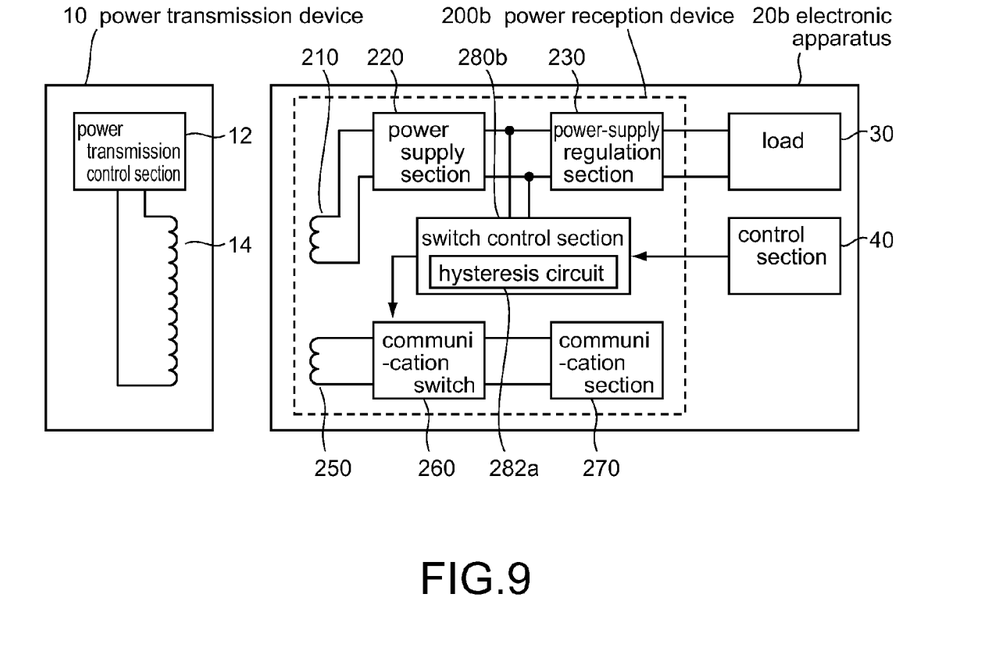
FIG. 9 is a block diagram schematically showing a power reception device according to a third embodiment of the present invention and the power transmission device.

As shown in FIG. 9, an electronic apparatus 20b according to a third embodiment of the present invention comprises a power reception device 200b, the load 30 and a control section 40. For example, the control section 40 is a Central Processing Unit (CPU) which controls the whole operation of a mobile telephone. As can be seen from FIGS. 8 and 9, the power reception device 200b is a modification of the power reception device 200a according to the second embodiment. Hereafter, explanation will be made only about differences between the second embodiment and the present embodiment as referring to Figures.

As shown in FIG. 9, the power reception device 200b comprises a switch control section 280b instead of the switch control section 280a (see FIG. 8). The switch control section 280b is not connected between the communication switch 260 and the communication section 270. Alternatively, the switch control section 280b is connected with the power supply section 220 as well as connected with the control section 40 outside of the power reception device 200b. Since the switch control section 280b is thus formed, the switch control section 280b can be notified by the control section 40 whether the communication section 270 is assigned to the signal transmission via the communication antenna 250 or not. The switch control section 280a shifts the value of the first voltage into the third threshold (see FIG. 7) when the notification from the control section 40 notifies the switch control section 280a that the communication section 270 is assigned to the signal transmission.

As can be seen from the above explanation, according to the present embodiment, a method different from that of the second embodiment can be used to obtain a trigger which causes the value of the first voltage to be shifted into the third threshold. Moreover, various other methods can be used to obtain a trigger which causes the shift of the value of the first voltage into the third threshold.

Forth Embodiment

Figure 10:
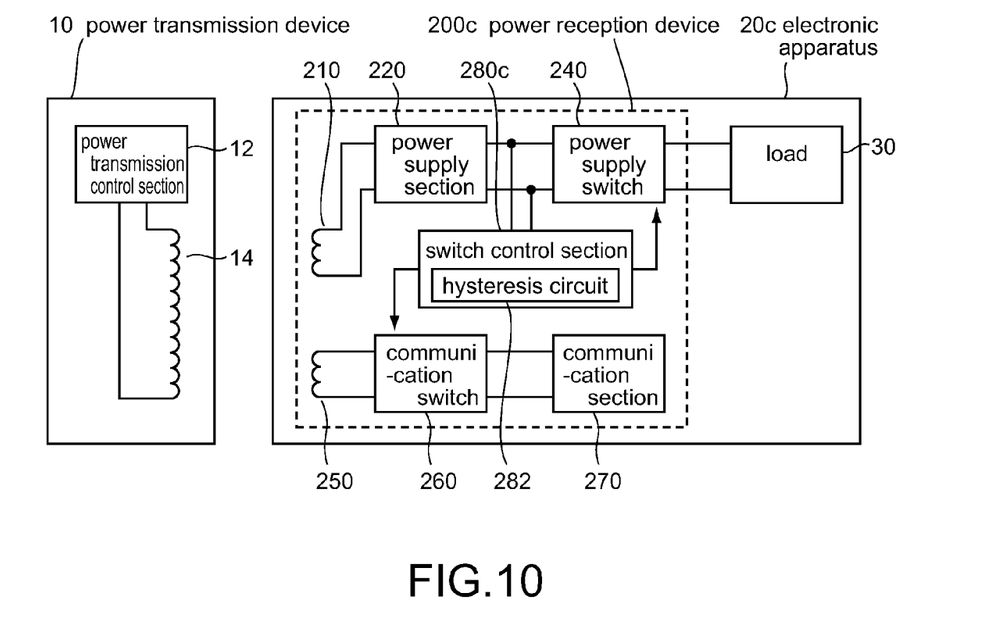
FIG. 10 is a block diagram schematically showing a power reception device according to a forth embodiment of the present invention and the power transmission device.

As shown in FIG. 10, an electronic apparatus 20c according to a forth embodiment of the present invention comprises a power reception device 200c and the load 30. As can be seen from FIGS. 1 and 10, the power reception device 200c is a modification of the power reception device 200 according to the first embodiment. Hereafter, explanation will be made only about differences between the first embodiment and the present embodiment as referring to Figures.

As shown in FIG. 10, the power reception device 200c comprises a power supply switch 240 while not comprising the power supply regulation section 230 (see FIG. 1). The power supply switch 240 is connected in series between the power supply section 220 and the load 30. The power supply switch 240 is formed to be switchable between an electrically connected state (i.e. power-supply enabled state) where the power supply section 220 is electrically connected with the load 30 and an electrically disconnected state (i.e. power-supply disabled state) where the power supply section 220 is electrically disconnected from the load 30. The power supply switch 240, which acts as described above, can be formed of FETs similar to the communication switch 260 (see FIGS. 2 to 6). More specifically, the power supply switch 240 can be formed by changing the N-channel FETs used in each of the circuits of FIGS. 2 to 6 into P-channel FETs.

The power reception device 200c comprises a switch control section 280c instead of the switch control section 280 (see FIG. 1). The switch control section 280c performs control to switch the communication switch 260 between the electrically connected state and the electrically disconnected state. In addition, the switch control section 280c performs control to switch the power supply switch 240 between the power-supply enabled state and the power-supply disabled state. In detail, the switch control section 280c switches the power supply switch 240 into the power-supply enabled state when the output voltage (V0) of the power supply section 220 increases above the first voltage, and switches the power supply switch 240 into the power-supply disabled state when the output voltage (V0) decreases below the second voltage (see FIG. 7).

Since the power supply switch 240 and the switch control section 280c are formed as described above, the load 30 can be electrically separated during the communication of the communication section 270. Accordingly, the load 30 can be prevented from partially consuming the electric power for communication. The electric power for communication can be therefore sufficiently obtained.

Moreover, the power supply switch 240 may be formed to be opened and closed during the electric power supply of the power supply section 220. In such formation, the power reception device 200c can make load modulation communication with the power transmission device 10 by opening and closing the power supply switch 240 while the power transmission device 10 transmits the electric power.

Fifth Embodiment

Figure 11:
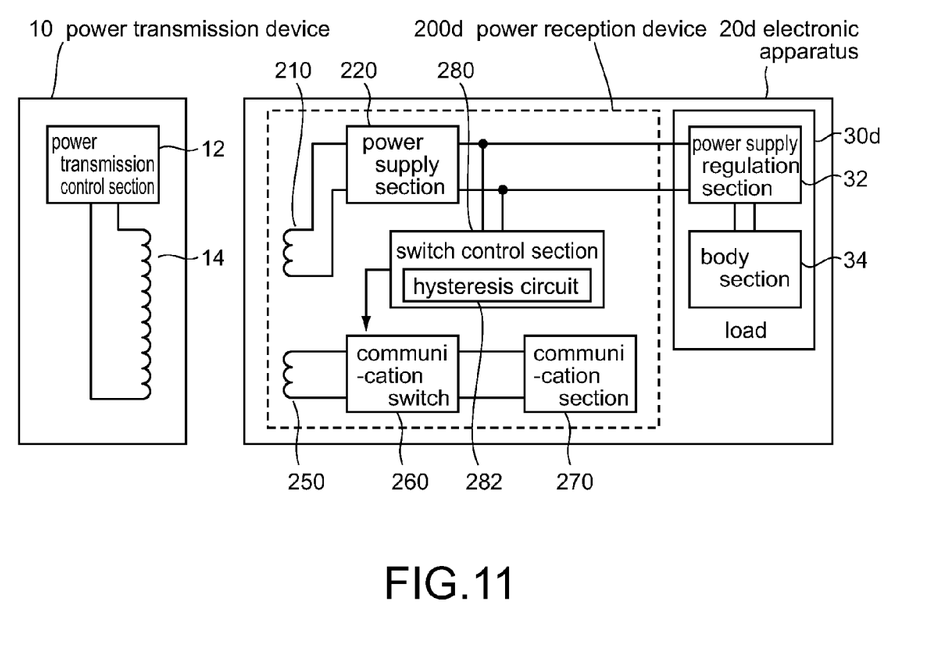
FIG. 11 is a block diagram schematically showing a power reception device according to a fifth embodiment of the present invention and the power transmission device.

As shown in FIG. 11, an electronic apparatus 20d according to a fifth embodiment of the present invention comprises a power reception device 200d and a load 30d. The load 30d comprises a power supply regulation section 32 and a body section 34. The body section 34 is connected with the power supply regulation section 32. The body section 34 according to the present embodiment is a battery, and the power supply regulation section 32 is a power charge control IC. The power supply regulation section 32 controls a current and a voltage of charged electric power in accordance with status such as a residual capacity of a battery. As can be seen from FIGS. 1 and 11, the power reception device 200d is a modification of the power reception device 200 according to the first embodiment. Hereafter, explanation will be made only about differences between the first embodiment and the present embodiment as referring to Figures.

As shown in FIG. 11, the power reception device 200d does not comprise the power supply regulation section 230 (see FIG. 1). The power supply section 220 is directly connected to the power supply regulation section 32 of the load 30d. When the load 30d is thus provided with the power supply regulation section 32, the power supply section 220 can be directly connected to the load 30d.

The present invention is not limited to the embodiments explained above. The present invention can be variously applied and modified.

For example, in the forth embodiment, the switch control section may use the third threshold to control the communication switch and the power supply switch similar to the second embodiment. Similarly, in the fifth embodiment, the switch control section may use the third threshold to control the communication switch similar to the second embodiment.

Moreover, the load, which is a power supply target of the power supply section, is not limited to the battery. Moreover, the power supply regulation section is not limited to the DC-to-DC converter or the power charge control IC. The load and the power supply regulation section may be formed in any way, provided that the switch control section 280 can use the first voltage and the second voltage different from each other to perform the hysteresis control. Moreover, the power supply regulation section does not need to be provided.

The present application is based on a Japanese patent application of JP2013-093240 filed before the Japan Patent Office on Apr. 26, 2013, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 10 power transmission device
12 power transmission control section
14 power transmission antenna
20, 20a, 20b, 20c, 20d electronic apparatus
30, 30d load
32 power supply regulation section
34 body section
40 control section
200, 200a, 200b, 200c, 200d power reception device
210 power reception antenna
220 power supply section
230 power supply regulation section
240 power supply switch
250 communication antenna
260, 260u, 260v, 260w, 260x communication switch
262, 262u in-line switch
264, 264u ground switch
266, 266u, 266w, 266x protection section
268x diode array
270 communication section
280, 280a, 280b, 280c switch control section
282 hysteresis circuit
290 line
292 connection point

The invention claimed is:
1. A power reception device comprising:
a power reception antenna which receives electric power in a non-contact manner;

a power supply section which is connected with the power reception antenna and outputs an output voltage depending on electric power received via the power reception antenna;

a communication antenna, the communication antenna being separate from the power reception antenna;

a communication section which makes communication via the communication antenna;

a communication switch which is connected between the communication antenna and the communication section and is switchable between an electrically connected state where the communication section is electrically connected with the communication antenna and an electrically disconnected state where the communication section is electrically disconnected from the communication antenna; and a switch control section which is connected with the power supply section and performs control to switch the communication switch between the electrically connected state and the electrically disconnected state, wherein the switch control section switches the communication switch into the electrically disconnected state when the output voltage increases above a first voltage, and switches the communication switch into the electrically connected state when the output voltage decreases below a second voltage smaller than the first voltage.

2. The power reception device as recited in claim 1, wherein:

when the power supply section starts to output the output voltage, the output voltage reaches a maximum value and subsequently reaches a stable value smaller than the maximum value;

the first voltage has a value equal to a first threshold which is larger than the stable value and smaller than the maximum value; and the second voltage has a value equal to a second threshold which is smaller than the stable value.

3. The power reception device as recited in claim 1, wherein:

when the power supply section starts to output the output voltage, the output voltage reaches a maximum value and subsequently reaches a stable value smaller than the maximum value;

when the communication section is not assigned to signal transmission via the communication antenna, the first voltage has a value equal to a first threshold which is larger than the stable value and smaller than the maximum value;

when the communication section is assigned to the signal transmission via the communication antenna, the first voltage has another value equal to a third threshold which is larger than the first threshold; and the second voltage has a value equal to a second threshold which is smaller than the stable value.

4. The power reception device as recited in claim 3, wherein the switch control section is connected between the communication switch and the communication section, and the switch control section uses an output from the communication section to detect whether the communication section is assigned to the signal transmission via the communication antenna or not.

5. The power reception device as recited in claim 3, wherein:

the switch control section is connected with a control section outside of the power reception device; and the switch control section is notified from the control section whether the communication section is assigned to the signal transmission via the communication antenna or not.

6. The power reception device as recited in claim 1, wherein:

the power supply section is directly or indirectly connected to a load outside of the power reception device; and a supply voltage depending on the output voltage is supplied to the load.

7. The power reception device as recited in claim 6, further comprising a power supply regulation section which is connected between the power supply section and the load, wherein the power supply regulation section regulates the output voltage supplied to the load.

8. The power reception device as recited in claim 7, wherein:

the power supply section includes a rectifier circuit; and the power supply regulation section includes a DC-to-DC converter.

9. The power reception device as recited in claim 6, further comprising a power supply switch connected between the power supply section and the load, wherein:

the power supply switch is switchable between a power-supply enabled state where the power supply section is electrically connected with the load and a power-supply disabled state where the power supply section is electrically disconnected from the load; and the switch control section switches the power supply switch into the power-supply enabled state when the output voltage increases above the first voltage, and switches the power supply switch into the power-supply disabled state when the output voltage decreases below the second voltage.

10. The power reception device as recited in claim 6, wherein:

the load includes a power supply regulation section and a body section connected with the power supply regulation section; and the power supply section is directly connected to the power supply regulation section.

11. The power reception device as recited in claim 1, wherein:

the communication switch has an in-line switch and a ground switch;

the in-line switch is connected in series between the communication antenna and the communication section; and the ground switch is connected between a connection point and ground, wherein the connection point is located between the communication antenna and the communication section.

12. The power reception device as recited in claim 11, wherein each of the in-line switch and the ground switch includes an N-channel FET.

13. An electronic apparatus comprising the power reception device as recited in claim 1.

* * * * *